Patented Mar. 20, 1934

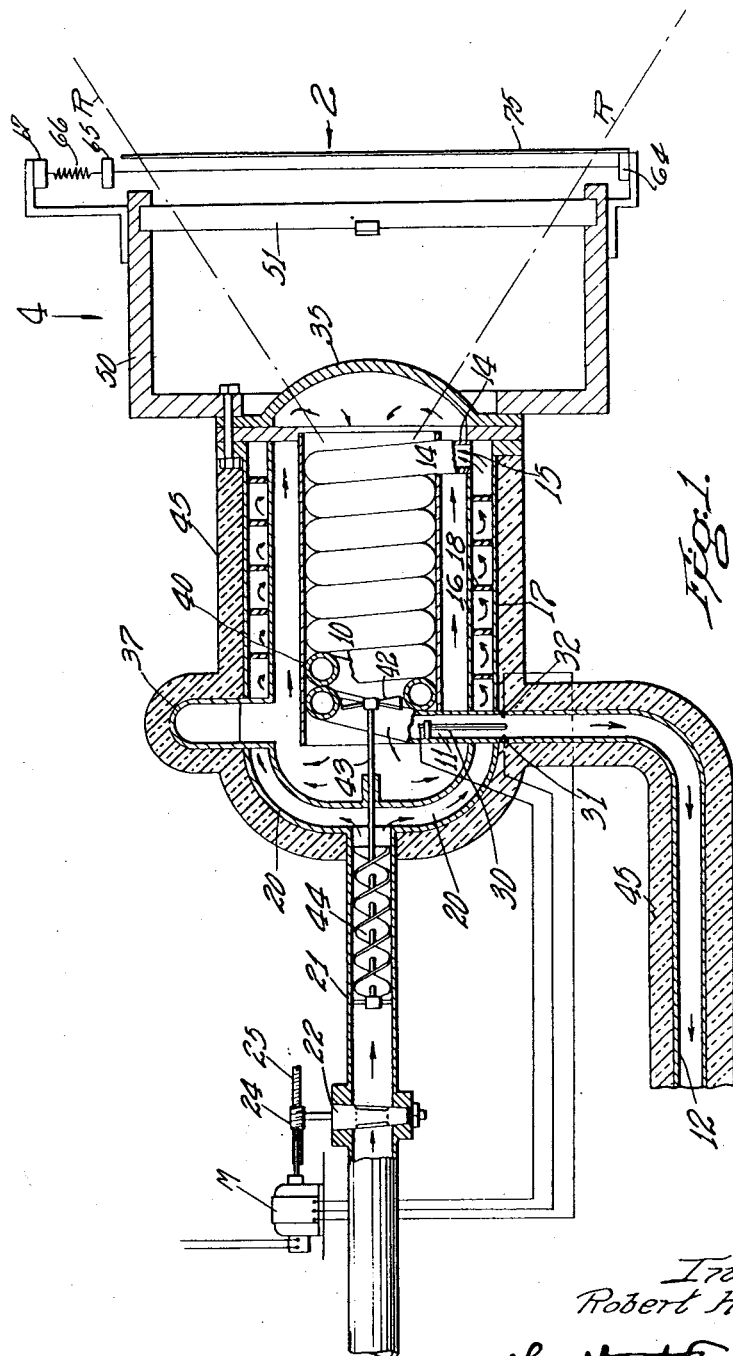

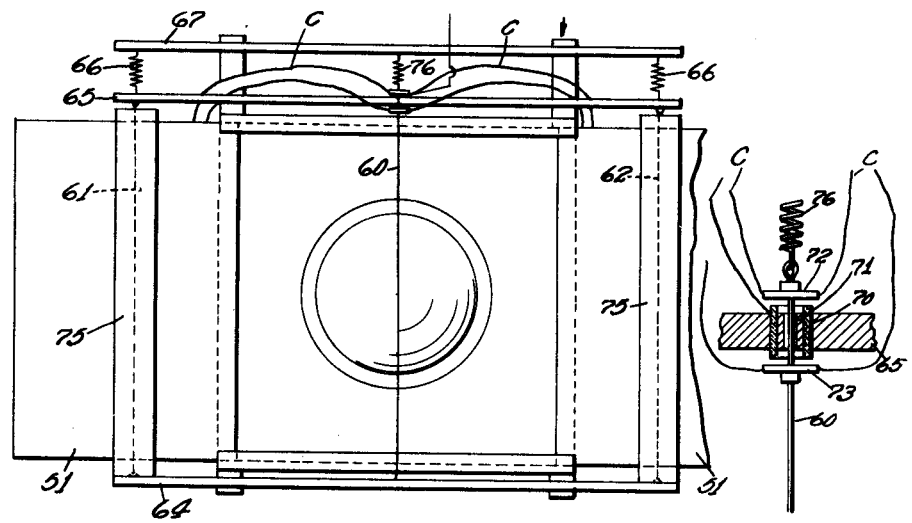

1,951,403

UNITED STATES PATENT OFFICE 1,951,403

HEAT ABSORBING APPARATUS FOR USE WITH SOLAR ENERGY

Robert H. Goddard, Worcester, Mass.

Application October 30, 1930, Serial No. 492,269

18 Claims. (Cl. 126—271)

This invention relates to means for absorbing solar energy and heating a fluid by the absorbed energy.

One object of my invention is to provide apparatus by which a fluid thus heated may be discharged from the apparatus at a definite and predetermined temperature.

Other objects of the invention are the provision of means for increasing the rate of circulation of a heat-conducting liquid in the apparatus, and means for automatically preventing the cooling of the apparatus by the passage of clouds over the face of the sun.

My invention further relates to arrangements and combinations of parts which will be hereinafter described and more particularly pointed out in the appended claims.

A preferred form of the invention is shown in the drawings, in which

Fig. 1 is a sectional side elevation of my improved heat-absorbing apparatus;

Fig. 2 is a front elevation thereof, looking in the direction of the arrow 2 in Fig. 1;

Fig. 3 is a detail sectional view of certain control mechanism to be described;

Fig. 4 is a detail plan view of certain parts, looking in the direction of the arrow 4 in Fig. 1;

Fig. 5 is a plan view of one of the door closing and opening devices;

Fig. 6 is a view similar to Fig. 5 but showing the parts in a different position, and Fig. 7 is a perspective view of a modified construction.

Referring particularly to Fig. 1, my improved heat-absorbing apparatus comprises a closely wound coil 10, preferably of copper or other suitable metal, connected at one end through a passage 11 to a discharge pipe 12.

At its outer end the coil 10 is connected by a passage 14 to one end of a spiral passage 15 formed between inner and outer cylindrical walls 16 and 17 and a spiral inner partition 18.

At its rear end, the spiral passage 15 is connected by branch passages 20 to an inlet pipe 21. A valve 22 controls the admission of fluid to the coil 10 and I have provided special mechanism for adjusting this valve so that the fluid discharged from the coil 10 may be kept at a substantially uniform predetermined temperature.

For this purpose I provide a motor M driving a worm 24 engaging a worm wheel 25 on the stem of the valve 22. The motor M is controlled by a thermostatic element 30 mounted in the discharge passage 11 and movable between contacts 31 and 32.

When the fluid is at the predetermined standard temperature, the element 30 is positioned midway between the contacts 31 and 32 and out of contact therewith. If the temperature falls, the element 30 swings to one side and engages one of the contacts, such as the contact 31, which causes the motor M to revolve in a direction to give the valve 22 a closing movement, thus reducing the flow of fluid to the coil.

The reduced flow of fluid naturally permits the coil to raise the temperature of the fluid and restore normal conditions. On the other hand, if the fluid is overheated, contact is made at 32 and the motor M is rotated in the opposite direction to give the valve 22 an opening movement.

In am thus able to discharge fluid, either as a heated liquid or as a heated vapor, from the pipe 12 at a substantially uniform temperature, regardless of variations in the amount of solar heat received by the coil 10. The inner wall 16 of the fluid-conducting passage is substantially spaced from the coil 10, both at the sides and at the rear end thereof, and the front end of the casing is formed by a transparent window 35, preferably of quartz and preferably also of segmental spherical shape.

The space within and surrounding the coil 10 is filled with a heat-absorbing liquid, such for example as oil containing finely divided carbon in suspension.

An expansion chamber 37 is provided at one side of the casing, which chamber is filled with air and permits expansion and contraction of the heat-absorbing liquid due to changes in temperature.

An open-ended cylindrical sleeve 40 preferably closely surrounds the coil 10, so that the heat-absorbing liquid is substantially out of contact with the coil 10 in its forward passage along the outer side thereof.

The solar heat rays R pass through the transparent window 35 and are concentrated on the heat-absorbing liquid at the front end of the coil 10. The construction is such that circulation will be set up within the casing, causing the liquid to follow the path indicated by the small arrows in Fig. 1, with the more highly heated portion of the liquid coming in contact with the inner faces of the coil 10.

In order to produce a more active circulation of the heat-absorbing liquid, I preferably provide a propeller 42 mounted near the rear end of the coil 10 on a shaft 43 which is positively rotated by a suitable motor mechanism.

In the drawings I have indicated a spiral-vane liquid motor 44 which is rotated by the in-flow of fluid through the pipe 21 and which in turn rotates the propeller 42. An active and positive circulation of the heat-absorbing liquid is thus obtained.

The outer casing wall 17, as well as the discharge pipe 12, are preferably provided with a heavy coating 45 of heat-insulating material.

Any solar heating apparatus is subject to cooling effects due to clouds or shadows and when such clouds or shadows occur, it is desirable to close the apparatus and conserve the heat already contained therein until such time as sunlight is restored.

For this purpose, I have provided a box-like structure 50 surrounding the transparent window 35 and provided with sliding doors 51 by which the front of the structure may be closed when sunlight is lacking. I have also provided automatic means for closing and opening the doors 51.

Such means comprises racks 53 (Figs. 4 and 5) on the doors 51, which racks are engaged by pinions 54 rotated by motors 55 and these motors 55 are actuated in accordance with sunlight conditions at the open front of the structure 50.

For the control of the motors, I provide three wires 60, 61 and 62. These wires are secured at their lower ends to a fixed cross bar 64 and the end wires 61 and 62 are secured at their upper ends to a movable cross bar 65. Springs 66 act through the bar 65 to tension the wires 61 and 62, the springs 66 being attached at their upper ends to a fixed cross bar 67.

A metallic sleeve 70 (Fig. 3) is fixed in the center of the movable cross bar 65 and the wire 60 extends freely through an insulating bushing 71 within the sleeve 70. Metal collars 72 and 73 are mounted in spaced relation on the wire 60 above and below the sleeve 70 but are insulated from the wire 60.

Suitable connections C are made from the sleeve 70 and the collars 72 and 73 to the motors 55. The wires 60, 61 and 62 are exposed to substantially the same temperature conditions but the wire 60 is exposed to the direct sunlight entering the structure 50 while the wires 61 and 62 are shielded therefrom by cover strips 75.

A spring 76 tensions the wire 60 to the same extent that the wires 61 and 62 are tensioned by the springs 66. With this construction, a uniform change in temperature of the three wires will cause all of the parts shown in Fig. 3 to move upward or downward as a unit and without changing their relative positions to cause contact between any of the members.

If the wire 60, however, is exposed to direct sunlight, the wire 60 will expand more rapidly than the wires 61 and 62, causing the collar 73 to engage the sleeve 70 and complete a circuit which will actuate the motors 55 in a direction to open the doors 51.

Upon the other hand, if the wire 60 is in shadow, it will contract, causing the collar 72 to engage the sleeve 70 and thus close a contact which will cause the motors 55 to close the doors 51.

In order to break the circuit when the movement of the doors is completed in either direction, I provide the mechanism shown in Figs. 5 and 6. A lever 80 is pivoted at 81 and is suitably connected in a control circuit of the motor 55. This lever is provided with a flexible contact member 82 adapted to engage contact points 83 and 84 to which conductors C are connected. This flexible contact member 82 is adapted to snap past a spring plunger 85 as it swings on its pivot 81.

Assuming that the parts are in the position shown in Fig. 5 and that the doors are given a closing movement, a pin 90 on each door 51 will engage the outer end of one of the levers 80 as the door approaches closed position, swinging the movable contact point 82 away from the fixed contact 83, past the spring plunger 85 and into engagement with the fixed contact 84. The door-closing circuit will thus be broken and the door-opening circuit will be established and will be ready for use when the wire 60 expands and shifts the contact of the sleeve 70 from the collar 72 to the collar 73.

Each pin 90 is also connected by a cord 92 to its lever 80, and each cord 92 will be tightened as the doors 51 approach their outer position, swinging the levers 82 and again reversing the motor control.

I am thus able to give the doors a closing movement when the wire 60 is placed in shadow and an opening movement when the wire 60 is again exposed to sunlight.

It is not necessary that the control wires should be mounted at the face of the structure 50, as they may be assembled in a separate casing, as indicated in Fig. 7, and furthermore the effect of the sunlight may be increased by placing a quartz cylinder or rod 100 in front of the middle wire. By this construction, the heating or cooling of the wire 60 will be accelerated.

Having thus described my invention and the operation thereof, it will be seen that I have provided an apparatus adapted for heating a fluid and for delivering the same at constant temperature, and that I have also provided for closing the apparatus and conserving the heat upon failure of sunlight, restoring the apparatus to operative condition when sunlight returns.

It will be understood that the fluid may be discharged from the apparatus through the pipe 12 in the form of a heated liquid or in the form of a heated vapor.

Having thus described my invention and the advantages thereof, I do not wish to be limited to the details herein disclosed, otherwise than as set forth in the claims, but what I claim is:—

1. Apparatus for absorbing solar heat comprising a heating coil through which flows a fluid to be heated, a casing surrounding said coil, a heat-absorbing liquid filling said casing and immersing said coil, means to direct solar heat rays into said heat-absorbing liquid, and means to vary the flow of fluid through said coil in accordance with the temperature of the heated fluid discharged therefrom.

2. Apparatus for absorbing solar heat comprising a heating coil through which flows a fluid to be heated, a casing surrounding said coil, a heat-absorbing liquid filling said casing and immersing said coil, means to direct solar heat rays into said heat-absorbing liquid, a valve controlling the flow of fluid through said coil, and means to open and close said valve in accordance with changes of temperature of the fluid discharged therefrom.

3. Apparatus for absorbing solar heat comprising a heating coil through which flows a fluid to be heated, means to direct solar heat rays against said coil, a valve controlling the flow of fluid through said coil, a reversible motor operative to open or close said valve, and a thermostatic element in the discharge passage from said coil, said element being effective to cause said motor to be started in one direction or the other upon increase or decrease of the temperature of the heated fluid discharged from said coil with respect to a predetermined standard temperature.

4. Apparatus for absorbing solar heat comprising a heating coil through which flows a fluid to be heated, a closed casing surrounding said coil, a heat-absorbing liquid filling said casing and immersing said coil, and means to direct solar heat rays into said heat-absorbing liquid at one end of said coil.

5. The combination in heat absorbing apparatus as set forth in claim 4, in which the heat absorbing liquid contains finely divided carbon in suspension.

6. Apparatus for absorbing solar heat comprising a heating coil through which flows a fluid to be heated, means to concentrate solar heat rays on a portion of said coil, and a casing surrounding said coil but spaced therefrom and having a helical feed passage therein through which fluid is admitted to said coil.

7. Apparatus for absorbing solar heat comprising a heating coil through which flows a fluid to be heated, means to concentrate solar heat rays on a portion of said coil, a casing surrounding said coil but spaced therefrom and containing a heat-absorbing liquid, and an expansion chamber on said casing for said liquid.

8. Apparatus for absorbing solar heat comprising a heating coil through which flows a fluid to be heated, a casing surrounding said coil but spaced therefrom and containing a heat-absorbing liquid, an entrance structure through which solar heat rays are admitted to said coil and casing, and automatic means for opening and closing said entrance structure in accordance with the occurrence or absence of sunlight.

9. Apparatus for absorbing solar heat comprising a heating coil through which flows a fluid to be heated, a casing surrounding said coil but spaced therefrom and containing a heat-absorbing liquid, an entrance structure through which solar heat rays are admitted to said coil and casing, and automatic means to open said structure in bright sunlight and to close said structure on the absence of sunlight, said opening and closing being independent of changes in temperature of the atmosphere.

10. The combination in heat-absorbing apparatus as set forth in claim 9, in which said automatic means comprises a plurality of expansion members, certain only of which are exposed to direct sunlight.

11. The combination in heat-absorbing apparatus as set forth in claim 9, in which said automatic means comprises three expansion members, one of which is exposed to a greater sunlight effect.

12. The combination in heat-absorbing apparatus as set forth in claim 9, in which said automatic means comprises a plurality of detecting elements simultaneously expansible upon changes of temperature and variably expansible upon changes in sunlight.

13. The combination in heat-absorbing apparatus as set forth in claim 9, in which said automatic means comprises a plurality of detecting elements, one of which is expansible relatively to the others when the apparatus is exposed to sunlight and contractible relatively to the others when the apparatus is in shade.

14. Apparatus for absorbing solar heat comprising a heating coil through which flows a liquid to be heated, a closed casing surrounding said coil, a heat-absorbing liquid filling said casing and immersing said coil, means to direct solar heat rays into said heat-absorbing liquid at one end of said coil, a propeller in said coil to force circulation of the heat-absorbing liquid, and a spiral-vane motor connected to turn said propeller, said motor being driven by the flow of liquid in the inlet connection to the coil.

15. Apparatus for absorbing solar heat comprising a heating coil through which flows a fluid to be heated, a casing surrounding said coil, a liquid filling said casing and immersing said coil and having outstanding heat-absorbing characteristics, and a transparent window through which solar heat rays are directed into said heat-absorbing liquid adjacent one end of said coil.

16. Apparatus for absorbing solar heat comprising a heating coil through which flows a fluid to be heated, a source of fluid supply, a casing surrounding said coil but spaced therefrom, a heat-absorbing liquid filling said casing and immersing said coil, means to direct solar heat rays into said heat-absorbing liquid adjacent one end of said coil, and means to conduct fluid from said source of supply in a helical path within said casing and around said coil to the end of the coil at which solar heat is absorbed by said liquid, whereby said fluid is preheated before entering said coil.

17. Solar heating apparatus as set forth in claim 16, in which a cylindrical open-ended sleeve closely surrounds the coil and substantially prevents active circulation of heat-absorbing liquid about the outside of said coil.

18. Solar heating apparatus as set forth in claim 16, in which the casing is provided with a heavy heat-insulating coating on its outer surface.

ROBERT H. GODDARD.